(12) United States Patent
Yamasaki

(10) Patent No.: US 11,016,379 B2
(45) Date of Patent: May 25, 2021

(54) PROJECTOR AND CONTROL METHOD OF PROJECTOR FOR NOTIFYING IMAGE SUPPLY DEVICE OF RESOLUTION INFORMATION

(71) Applicant: SEIKO EPSON CORPORATION, Tokyo (JP)

(72) Inventor: Ryutaro Yamasaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/556,420

(22) Filed: Aug. 30, 2019

(65) Prior Publication Data

US 2020/0077063 A1    Mar. 5, 2020

(30) Foreign Application Priority Data

Sep. 3, 2018    (JP) .............................. JP2018-164208

(51) Int. Cl.
*G03B 21/26* (2006.01)
*H04N 9/31* (2006.01)
*G03B 21/14* (2006.01)
*G03B 21/20* (2006.01)

(52) U.S. Cl.
CPC ............ *G03B 21/26* (2013.01); *G03B 21/14* (2013.01); *G03B 21/147* (2013.01); *G03B 21/206* (2013.01); *G03B 21/208* (2013.01); *G03B 21/2053* (2013.01); *H04N 9/3147* (2013.01); *H04N 9/3188* (2013.01)

(58) Field of Classification Search
CPC .... H04N 9/3188; H04N 9/3147; G03B 21/14; G03B 21/147; G03B 21/2053; G03B 21/206; G03B 21/208; G03B 21/26
See application file for complete search history.

(56) References Cited

U.S. PATENT DOCUMENTS

| | | | |
|---|---|---|---|
| 10,397,533 B2* | 8/2019 | Mizushiro | H04N 9/3179 |
| 2008/0266321 A1* | 10/2008 | Aufranc | G09G 3/002 345/626 |
| 2010/0117929 A1* | 5/2010 | Fujimori | H04N 9/3185 345/1.3 |

(Continued)

FOREIGN PATENT DOCUMENTS

| | | |
|---|---|---|
| JP | 2013-117631 A | 6/2013 |
| JP | 2016-212357 A | 12/2016 |
| JP | 2017-142339 A | 8/2017 |

*Primary Examiner* — Michelle M Iacoletti
*Assistant Examiner* — Magda Cruz
(74) *Attorney, Agent, or Firm* — Dority & Manning, P.A.

(57) ABSTRACT

A projector includes: a projecting section projecting a second image based on image information onto a projection surface onto which a first image is projected by another projector; a generating section generating resolution information indicating a resolution different between a first mode in which the first image and the second image are portions of an image indicated by the image information and the second image is connected with the first image and a second mode in which the first image and the second image are the image indicated by the image information and the second image is superimposed on the first image; and a notifying section notifying an image supply device supplying the image information of the resolution information generated by the generating section.

8 Claims, 6 Drawing Sheets

(56) References Cited

U.S. PATENT DOCUMENTS

| | | | |
|---|---|---|---|
| 2011/0063518 A1* | 3/2011 | Furui | G03B 37/00 |
| | | | 348/687 |
| 2013/0141475 A1 | 6/2013 | Kotani | |
| 2014/0104582 A1* | 4/2014 | Mori | H04N 9/3182 |
| | | | 353/30 |
| 2015/0347077 A1* | 12/2015 | Kataoka | G06F 3/1431 |
| | | | 345/1.1 |
| 2016/0291919 A1* | 10/2016 | Kurota | H04N 5/64 |
| 2017/0214895 A1* | 7/2017 | Fujioka | H04N 9/3182 |
| 2018/0084234 A1* | 3/2018 | Yamamoto | H04N 21/43635 |
| 2019/0052850 A1* | 2/2019 | Iguchi | H04N 9/3123 |
| 2019/0149783 A1* | 5/2019 | Kotani | G03B 21/2053 |
| | | | 353/94 |
| 2019/0166336 A1* | 5/2019 | Shindo | G06F 3/1446 |
| 2019/0191134 A1* | 6/2019 | Urano | H04N 9/3147 |
| 2020/0193568 A1* | 6/2020 | Aoyanagi | G03B 21/00 |

\* cited by examiner

|  | FIRST PROJECTOR | SECOND PROJECTOR | THIRD PROJECTOR |
|---|---|---|---|
| NUMBER OF HORIZONTAL IMAGES | 3 | 3 | 3 |
| NUMBER OF VERTICAL IMAGES | 1 | 1 | 1 |
| HORIZONTAL POSITION OF PROJECTION IMAGE | 1 | 2 | 3 |
| VERTICAL POSITION OF PROJECTION IMAGE | 1 | 1 | 1 |

PROJECTOR AND CONTROL METHOD OF PROJECTOR FOR NOTIFYING IMAGE SUPPLY DEVICE OF RESOLUTION INFORMATION

The present application is based on, and claims priority from JP Application Serial Number 2018-164208, filed Sep. 3, 2018, the disclosure of which is hereby incorporated by reference herein in its entirety.

BACKGROUND

1. Technical Field

The present disclosure relates to a projector and a control method of a projector.

2. Related Art

JP-A-2013-117631 discloses a projection system that connects projection images projected by a plurality of projectors to display a tiling image. In this projection system, the plurality of projectors are connected in a cascade fashion, and the top projector in the cascade connection calculates the resolution of the tiling image and generates extended display identification data (EDID) indicating the resolution of the tiling image. The top projector causes an image supply device to read the EDID. The image supply device generates, based on the EDID, image information indicating the tiling image.

Examples of a method of displaying one image, as a whole, using projection images projected by a plurality of projectors include, in addition to the method of displaying the tiling image as disclosed in JP-A-2013-117631, a method of displaying a stack image by superimposing a plurality of projection images of the same image.

The projection system disclosed in JP-A-2013-117631 can generate only the EDID indicating the resolution of the tiling image, and therefore cannot cause the image supply device to generate image information corresponding to the resolution of a stack image.

SUMMARY

A projector according to one aspect of the present disclosure includes: a projecting section projecting a second image based on image information onto a projection surface onto which a first image is projected by another projector; a generating section generating resolution information indicating a resolution different between a first mode in which the first image and the second image are portions of an image indicated by the image information and the second image is connected with the first image and a second mode in which the first image and the second image are the image indicated by the image information and the second image is superimposed on the first image; and a notifying section notifying an image supply device supplying the image information of the resolution information generated by the generating section.

A control method of a projector according to one aspect of the present disclosure includes: projecting a second image based on image information onto a projection surface onto which a first image is projected by another projector; generating resolution information indicating a resolution different between a first mode in which the first image and the second image are portions of an image indicated by the image information and the second image is connected with the first image and a second mode in which the first image and the second image are the image indicated by the image information and the second image is superimposed on the first image; and notifying an image supply device supplying the image information of the resolution information.

DESCRIPTION OF EXEMPLARY EMBODIMENTS

A: First Embodiment

A1: Outline of Multi-Projection System 1

Figure 1:
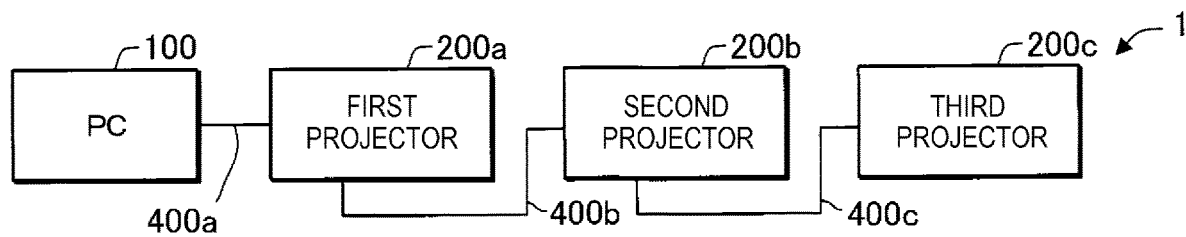
FIG. 1 is a diagram showing one example of a multi-projection system.

FIG. 1 is a diagram showing one example of a multi-projection system 1 including a first projector 200*a* according to a first embodiment.

The multi-projection system 1 includes a personal computer (PC) 100, the first projector 200*a*, a second projector 200*b*, and a third projector 200*c*. In the following, when there is no need to distinguish the first projector 200*a*, the second projector 200*b*, and the third projector 200*c*, each of the first projector 200*a*, the second projector 200*b*, and the third projector 200*c* is referred to as "projector 200". In the multi-projection system 1, the number of the projectors 200 is not limited to three, and may be two or more.

The PC 100 is one example of an image supply device. The image supply device may be generally referred to as a source device. The image supply device is not limited to the PC 100. For example, a digital versatile disc (DVD) player may be used as the image supply device. The PC 100 is connected with the first projector 200*a* via a first cable 400*a*. The PC 100 supplies image information indicating an image to the first projector 200*a*.

The PC 100, the first projector 200*a*, the second projector 200*b*, and the third projector 200*c* are connected in this order in a so-called cascade fashion. In the following, the connection in a cascade fashion is referred to as "cascade connection". Here, the position of the top in the cascade connection, that is, the position of the PC 100 means an "upstream" position, and the position of the bottom, that is, the position of the third projector 200*c* means a "downstream" position. The first projector 200*a* is connected with the second projector 200b via a second cable 400b. The first projector 200a is one example of another projector. The second projector 200b is connected with the third projector 200c via a third cable 400c.

Each of the first projector 200a, the second projector 200b, and the third projector 200c projects a projection image onto a projection surface such as a screen. Hereinafter, the projection image of the first projector 200a is referred to as "first projection image". The projection image of the second projector 200b is referred to as "second projection image". The projection image of the third projector 200c is referred to as "third projection image". The first projection image is one example of a first image. The second projection image is one example of a second image.

Figure 2:
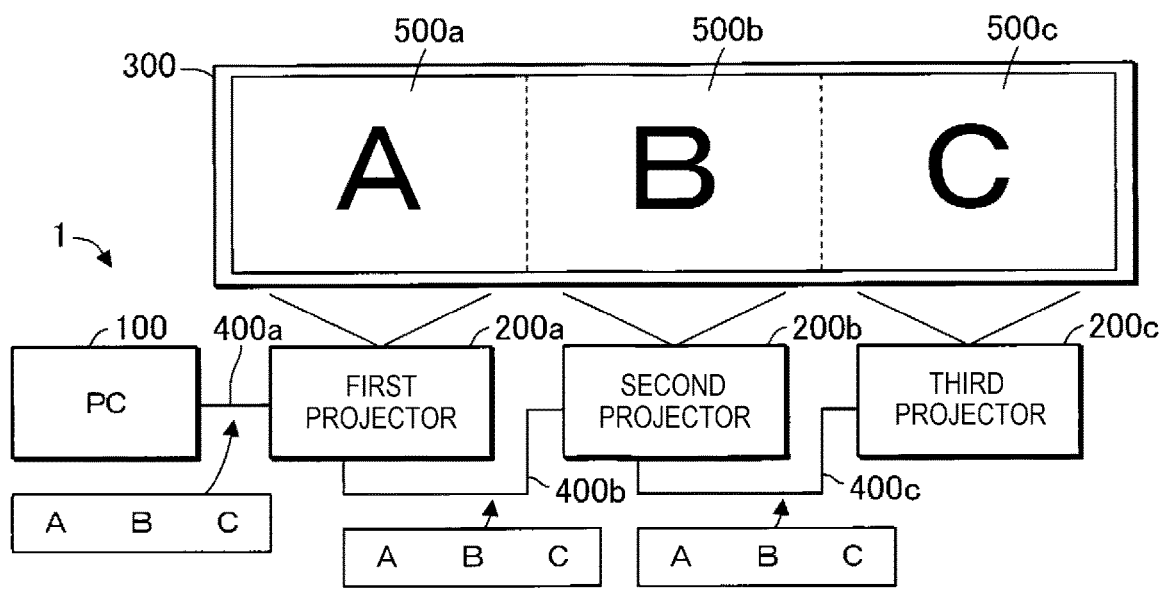
FIG. 2 is a diagram showing one example of a projection image of the multi-projection system in a tiling mode.
Figure 3:
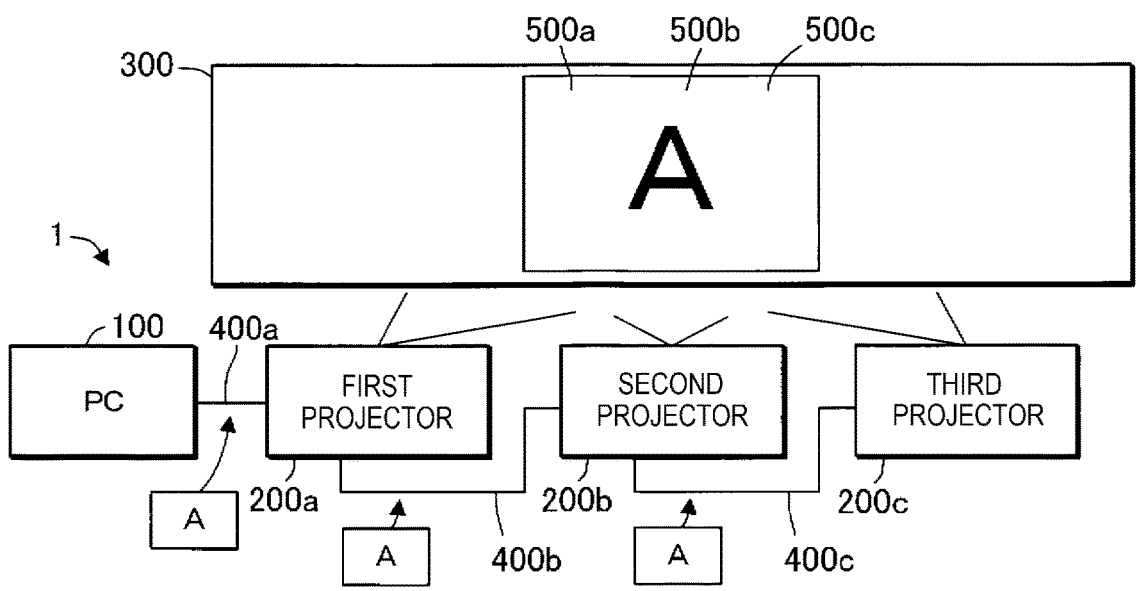
FIG. 3 is a diagram showing one example of a projection image of the multi-projection system in a stack mode.

The multi-projection system 1 has a tiling mode and a stack mode. The tiling mode is one example of a first mode. The stack mode is one example of a second mode. FIG. 2 is a diagram showing one example of a projection image of the multi-projection system 1 in the tiling mode. FIG. 3 is a diagram showing one example of a projection image of the multi-projection system 1 in the stack mode.

In the tiling mode, each of the first projection image 500a, the second projection image 500b, and the third projection image 500c is a portion of an image indicated by image information supplied from the PC 100, that is, a partial image of the image, and the first projection image 500a, the second projection image 500b, and the third projection image 500c are connected to one another on a projection surface 300.

In the example shown in FIG. 2, the image information supplied from the PC 100 indicates the image of "ABC". The first projection image 500a represents "A" as a portion of "ABC". The second projection image 500b represents "B" as a portion of "ABC". The third projection image 500c represents "C" as a portion of "ABC". On the projection surface 300, the first projection image 500a, the second projection image 500b, and the third projection image 500c are connected to one another to generate the tiling image of "ABC". The tiling image is one example of a third image.

In the embodiment, the tiling image is generated by connecting the first projection image 500a, the second projection image 500b, and the third projection image 500c in the horizontal direction of an image. However, a form in which a plurality of projection images are connected for generating a tiling image is not limited to a form in which the plurality of projection images are connected in the horizontal direction, but may be a form in which the plurality of projection images are connected in the vertical direction or may be a from in which the plurality of projection images are connected in the vertical direction and the horizontal direction.

In the stack mode, each of the first projection image 500a, the second projection image 500b, and the third information supplied from the PC 100, and the first projection image 500a, the second projection image 500b, and the third projection image 500c are superimposed on one another on the projection surface 300.

In the example shown in FIG. 3, the image information supplied from the PC 100 indicates the image of "A". Each of the first projection image 500a, the second projection image 500b, and the third projection image 500c represents "A.". On the projection surface 300, the first projection image 500a, the second projection image 500b, and the third projection image 500c are superimposed on one another to generate the stack image of "A". The stack image is one example of a fourth image.

Here, the projection position of the first projection image 500a, the projection position of the second projection image 500b, and the projection position of the third projection image 500c are adjusted by a user in each of the tiling mode and the stack mode.

A2: Configuration Example of PC 100

Figure 4:
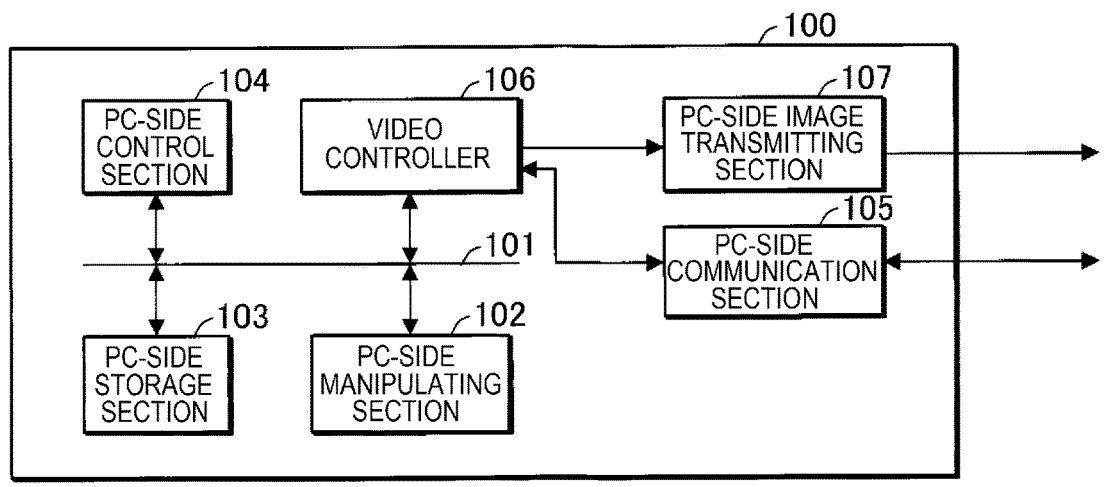
FIG. 4 is a diagram showing one example of a PC.

FIG. 4 is a diagram showing one example of the PC 100. The PC 100 includes a PC-side bus 101, a PC-side manipulating section 102, a PC-side storage section 103, a PC-side control section 104, a PC-side communication section 105, a video controller 106, and a PC-side image transmitting section 107.

The PC-side manipulating section 102, the PC-side storage section 103, the PC-side control section 104, and the video controller 106 are connected to each other via the PC-side bus 101. The PC-side manipulating section 102 is, for example, a keyboard or a mouse, and receives a user's manipulation. The PC-side storage section 103 is a computer-readable recording medium. The PC-side storage section 103 stores a program to define the operation of the PC 100, and various kinds of information.

The PC-side control section 104 is a computer such as a central processing unit (CPU). The PC-side control section 104 may include one or a plurality of processors. The PC-side control section 104 controls the PC 100 by reading and executing the program stored by the PC-side storage section 103.

The PC-side communication section 105 communicates with an external device as a receiving side of image information. In the embodiment, the external device is the first projector 200a. The PC-side communication section 105 reads, from the external device, EDID whose format is standardized by the video electronics standards association (VESA).

The EDID indicates characteristic information of a receiving-side device that receives the image information. The EDID includes resolution information indicating an image resolution that the receiving-side device can support. The image resolution is represented by the form of the product of the number of pixels in the horizontal direction and the number of pixels in the vertical direction in the image. Examples of the resolution include, for example, 1920×1080, 1280×720, and 720×480.

The video controller 106 is controlled by the PC-side control section 104 and generates image information. For example, the video controller 106 generates image information having a resolution indicated by the EDID read by the PC-side communication section 105.

The PC-side image transmitting section 107 transmits the image information generated by the video controller 106 to the external device, specifically to the first projector 200a.

A3: Configuration Example of First Projector 200a to Third Projector 200c

Figure 5:
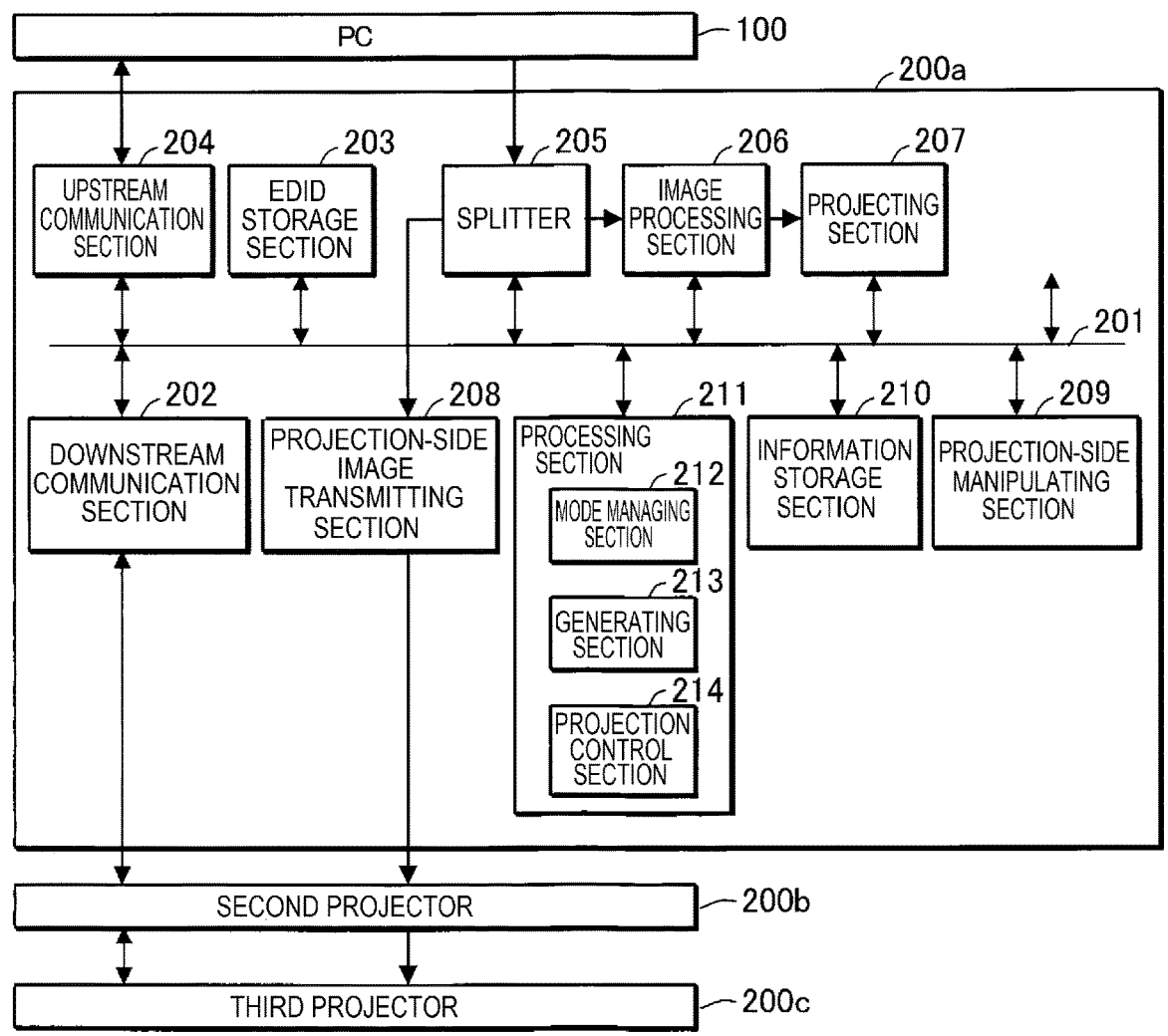
FIG. 5 is a diagram showing one example of a first projector to a third projector.

FIG. 5 is a diagram showing one example of the first projector 200a to the third projector 200c.

The first projector 200a, the second projector 200b, and the third projector 200c have the same configuration except for resolutions that the projectors can support. The resolutions that the first projector 200a, the second projector 200b, and the third projector 200c can support may be the same as each other.

To avoid a repetitive description, among the first projector 200a, the second projector 200b, and the third projector 200c, the configuration of the first projector 200a will be mainly described below.

The first projector 200a includes a projection-side bus 201, a downstream communication section 202, an EDID storage section 203, an upstream communication section 204, a splitter 205, an image processing section 206, a projecting section 207, a projection-side image transmitting section 208, a projection-side manipulating section 209, an information storage section 210, and a processing section 211.

Here, the term "downstream" means downstream of the cascade connection. For example, "downstream" of the first projector 200a means the second projector 200b side. "Downstream." of the second projector 200b means the third projector 200c side.

The term "upstream." means "upstream." of the cascade connection. For example, "upstream." of the first projector 200a means the PC 100 side. "Upstream." of the second projector 200b means the first projector 200a side.

The downstream communication section 202, the EDID storage section 203, the upstream communication section 204, the splitter 205, the image processing section 206, the projecting section 207, the projection-side image transmitting section 208, the projection-side manipulating section 209, the information storage section 210, and the processing section 211 are connected to each other via the projection-side bus 201.

The downstream communication section 202 communicates with a cascade-connected downstream device. Hereinafter, the cascade-connected downstream device is referred to as "downstream device". The downstream communication section 202 reads EDID from the downstream device. Specifically, the downstream communication section 202 requests EDID from the downstream device, and receives, in response to the request, the EDID notified from the downstream device. The downstream communication section 202 is one example of a receiving section. The EDID of each of the second projector 200b and the third projector 200c is one example of support information.

The EDID storage section 203 stores EDID. In the EDID stored in the EDID storage section 203, initial EDID initially set in the first projector 200a and EDID read by the downstream communication section 202 from the downstream device are reflected. The initial EDID initially set in the first projector 200a includes, for example, resolution information indicating a resolution that the first projector 200a can support. The initial EDID initially set in the first projector 200a is stored in the information storage section 210 of the first projector 200a.

The upstream communication section 204 communicates with a cascade-connected upstream device. Hereinafter, the cascade-connected upstream device is simply referred to as "upstream device". The upstream communication section 204 notifies, in response to a request from the upstream device, the upstream device of the EDID stored in the EDID storage section 203. The upstream communication section 204 is one example of a notifying section.

The splitter 205 is an image distributing section. The splitter 205 distributes image information received from the upstream device to the image processing section 206 and the projection-side image transmitting section 208.

The image processing section 206 performs image processing on image information. Examples of the image processing include, for example, a trapezoidal distortion correction process to correct the distortion of a projection image. The image processing is not limited to the trapezoidal distortion correction process, and can be appropriately changed.

In the tiling mode, the image processing section 206 cuts out, from the image information provided from the splitter 205, a portion whose projection is taken charge of by the first projector 200a, performs image processing on the image information after being cut out, and generates an image signal. Cut-out portion information indicating the portion whose projection is taken charge of by the first projector 200a is stored in the information storage section 210. The image processing section 206 executes the cutting out described above using the cut-out portion information stored in the information storage section 210.

In the stack mode, the image processing section 206 performs, without performing cutting out on the image information provided from the splitter 205, image processing on the image information, and generates an image signal.

The projecting section 207 projects, onto the projection surface 300, an image according to the image signal generated by the image processing section 206. The projection-side image transmitting section 208 transmits the image information provided from the splitter 205 to the downstream device. The projection-side manipulating section 209 is, for example, various manipulating buttons or manipulating keys, or a touch panel. The projection-side manipulating section 209 receives a user's input manipulation.

The information storage section 210 is a computer-readable recording medium. The information storage section 210 stores a program to define the operation of the first projector 200a, and various kinds of information.

The processing section 211 is a computer such as a CPU. The processing section 211 may include one or a plurality of processors. The processing section 211 realizes a mode managing section 212, a generating section 213, and a projection control section 214 by reading and executing the program stored by the information storage section 210.

The mode managing section 212 manages, for example based on a manipulation accepted by the projection-side manipulating section 209, whether the first projector 200a is in the tiling mode or the stack mode. Moreover, the mode managing section 212 manages, based on a manipulation accepted by the projection-side manipulating section 209, whether the first projector 200a is positioned most upstream of the cascade connection among the first projector 200a, the second projector 200b, and the third projector 200c.

The generating section 213 generates, for example, resolution information indicating a resolution different between the tiling mode and the stack mode. In the embodiment, the generating section 213 generates resolution information included in EDID.

The projection control section 214 controls the image processing section 206 and the projecting section 207 to control the projection of an image by the first projector 200a.

A4: Configuration Example of Projecting Section 207

Figure 6:
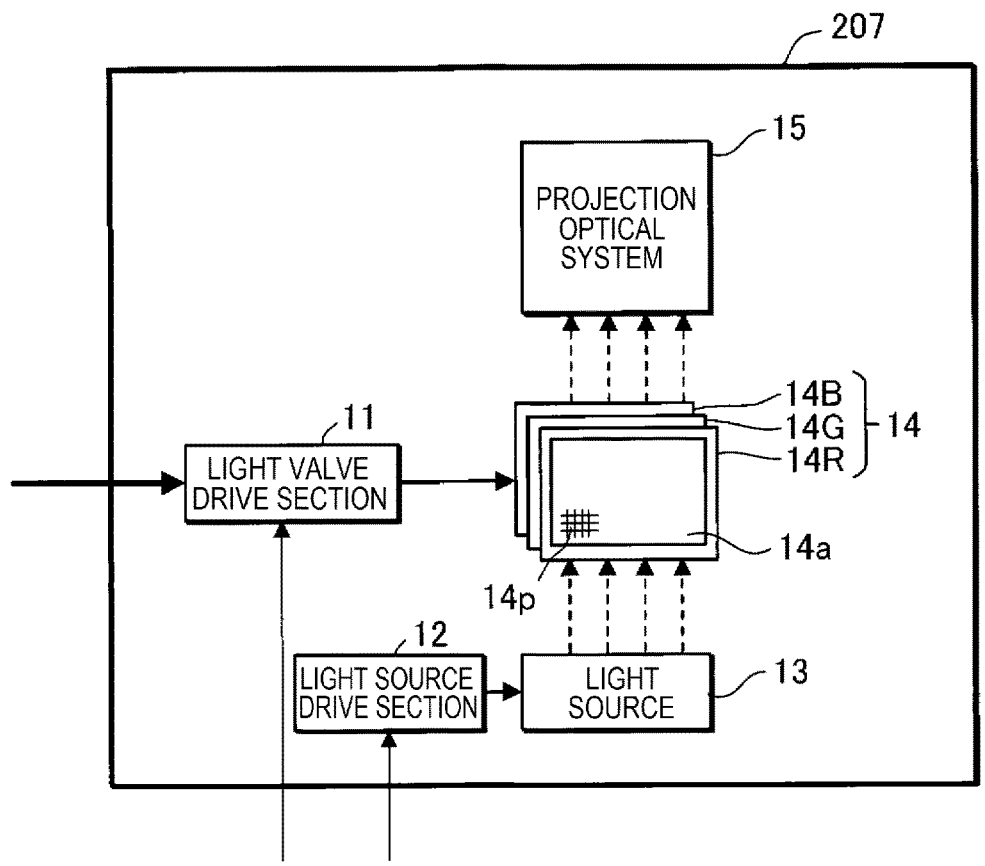
FIG. 6 is a diagram showing one example of a projecting section.

FIG. 6 is a diagram showing one example of the projecting section 207. The projecting section 207 includes a light valve drive section 11, a light source drive section 12, a light source 13, a liquid crystal light valve 14R for red, a liquid crystal light valve 14G for green, a liquid crystal light valve 14B for blue, and a projection optical system 15. Hereinafter, there is no need to distinguish the liquid crystal light valve 14R for red, the liquid crystal light valve 14G for green, and the liquid crystal light valve 14B for blue from one another, each of the liquid crystal light valve 14R for red, the liquid crystal light valve 14G for green, and the liquid crystal light valve 14B for blue is simply referred to as "liquid crystal light valve 14".

The light valve drive section 11 drives the liquid crystal light valve 14 based on an image signal. The light source drive section 12 drives the light source 13.

The light source 13 is a xenon lamp, an extra-high-pressure mercury lamp, a light emitting diode (LED), a laser light source, or the like. Variations in the brightness distribution of light emitted from the light source 13 are reduced by an integrator optical system (not shown), and thereafter, the light is separated by a color separating optical system (not shown) into color light components of red, green, and blue, which are three primary colors of light. The red color light component is incident on the liquid crystal light valve 14R for red. The green color light component is incident on the liquid crystal light valve 14G for green. The blue color light component is incident on the liquid crystal light valve 14B for blue.

The liquid crystal light valve 14 includes, for example, a liquid crystal panel in which liquid crystal is present between a pair of transparent substrates. The liquid crystal light valve 14 includes a rectangular pixel region 14a including a plurality of pixels 14p positioned in a matrix. In the liquid crystal light valve 14, a drive voltage can be applied to the liquid crystal for each of the pixels 14p. When the light valve drive section 11 applies, to each of the pixels 14p, the drive voltage based on an image signal input from the image processing section 206, each of the pixels 14p is set to a light transmittance based on the image signal. For this reason, the light emitted from the light source 13 is modulated by passing through the pixel region 14a, and an image based on the image signal is formed for each color light.

The images of the respective colors are combined by a color combining optical system (not shown) for each of the pixels 14p, and a projection image as a color image is generated. The projection image is projected by the projection optical system 15 onto the projection surface 300.

A5: Most-Upstream Projector Setting Operation

Figure 7:
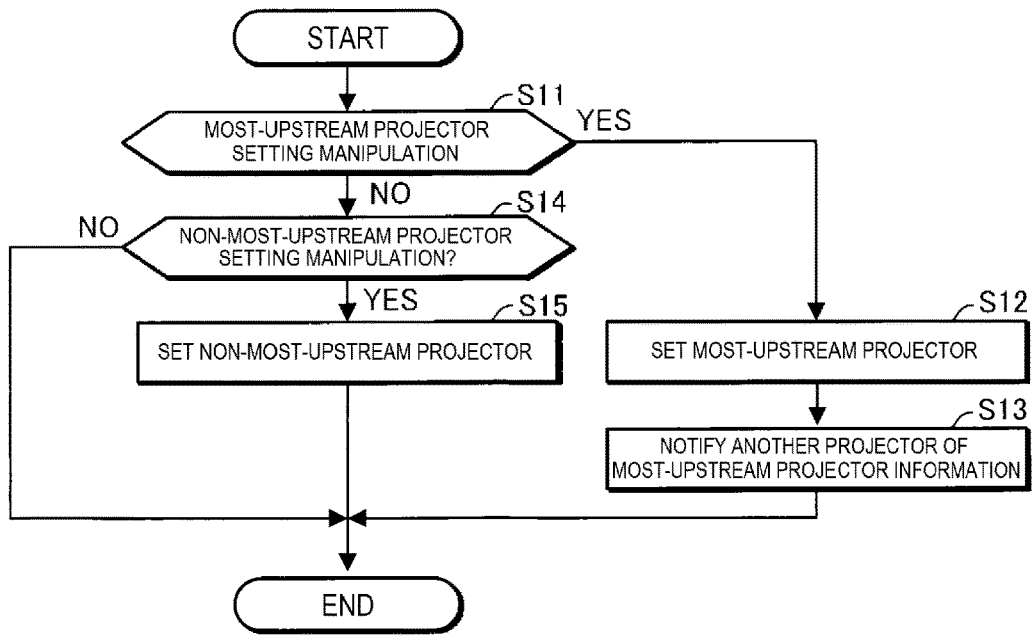
FIG. 7 is a flowchart for explaining a mode setting operation in the projector.

FIG. 7 is a flowchart for explaining an operation relating to most-upstream projector setting in the projector 200. Here, the term "most-upstream projector" means the top of the plurality of cascade-connected projectors 200, and more specifically means the projector 200 to which image information is supplied from the PC 100 among the plurality of projectors 200. In the example shown in FIG. 1, the first projector 200a is the most-upstream projector.

When the projection-side manipulating section 209 receives a most-upstream projector setting manipulation to set this projector 200 as the most-upstream projector of the cascade connection among the first projector 200a, the second projector 200b, and the third projector 200c in Step S11, the mode managing section 212 executes setting of the most-upstream projector in Step S12.

Subsequently, in Step S13, the mode managing section 212 notifies, using the downstream communication section 202, another projector 200 of most-upstream projector information indicating that this projector 200 is the most-upstream projector, and causes the another projector 200 to hold the most-upstream projector information.

Moreover, when the projection-side manipulating section 209 receives a non-most-upstream projector setting manipulation to set this projector 200 as a non-most-upstream projector in Step S14, the mode managing section 212 cancels the setting of the most-upstream projector and executes the setting of the non-most-upstream projector in Step S15.

On the other hand, when the projection-side manipulating section 209 does not receive both the most-upstream projector setting manipulation and the non-most-upstream projector setting manipulation, the mode managing section 212 does not change the setting of the most-upstream projector and the non-most-upstream projector and maintains the setting.

A6: Mode Setting Operation

Figures 8, 9:
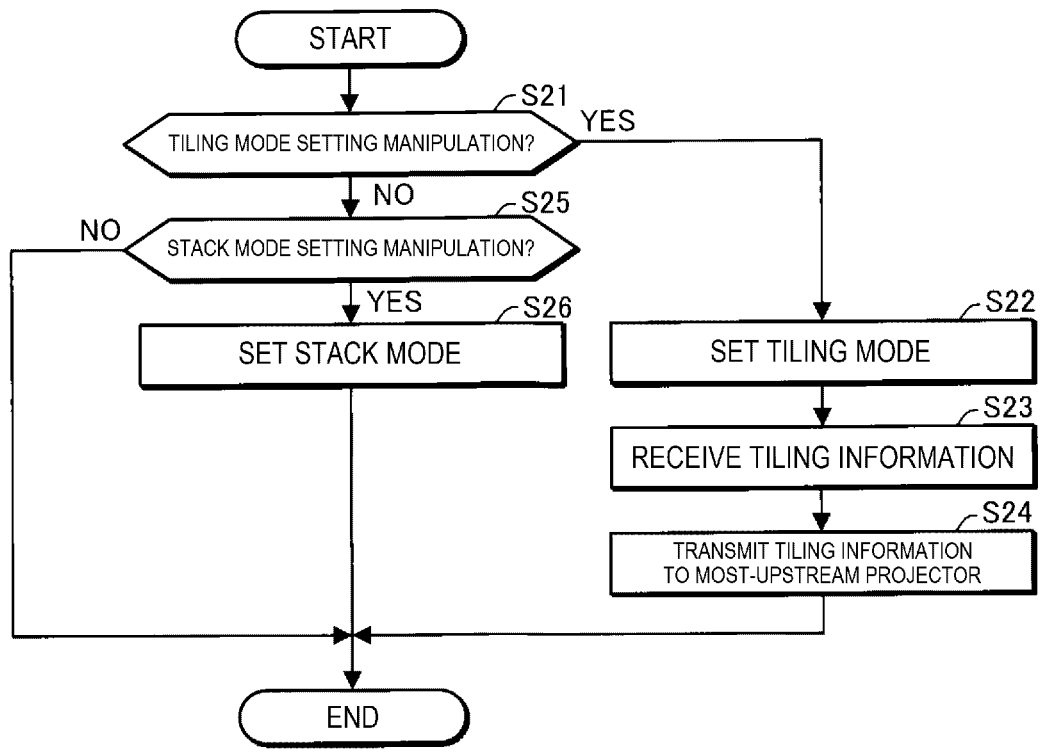
FIG. 8 is a flowchart for explaining an operation relating to most-upstream projector setting in the projector.
FIG. 9 is a diagram showing one example of tiling information.

FIG. 8 is a flowchart for explaining a mode setting operation in the projector 200.

When the projection-side manipulating section 209 receives a tiling mode setting manipulation to set the tiling mode from the user in Step S21, the mode managing section 212 sets an operating mode to the tiling mode in Step S22.

Subsequently, when the projection-side manipulating section 209 receives tiling information used for generating a tiling image in Step S23, the mode managing section 212 notifies, using the upstream communication section 204, the most-upstream projector 200 of the tiling information and causes the most-upstream projector 200 to hold the tiling information in Step S24.

FIG. 9 shows one example of the tiling information held in the information storage section 210 by the most-upstream projector 200, that is, by the first projector 200a.

In this example, the numbers of projection images arranged are "3" in the horizontal direction and "1" in the vertical direction. Information on the numbers of projection images is shown in the column of the number of horizontal images and the column of the number of vertical images in the tiling information. Moreover, the positions of projection images are arranged from the left in order of the first projection image 500a, the second projection image 500b, and the third projection image 500c. Information on the positions of projection images is shown in the column of the horizontal position of the projection image and the column of the vertical position of the projection image in the tiling information.

The tiling information is applicable not only to a tiling image composed of 3×1 images in the horizontal and vertical directions but also to another tiling image.

The description returns to FIG. 8. When the projection-side manipulating section 209 receives a stack mode setting manipulation to set the stack mode in Step S25, the mode managing section 212 sets the operating mode to the stack mode in Step S26.

On the other hand, when the projection-side manipulating section 209 does not receive both the tiling mode setting manipulation and the stack mode setting manipulation, the mode managing section 212 does not change the operating mode and maintains the operating mode.

A7: Operation to Acquire EDID

Figure 10:
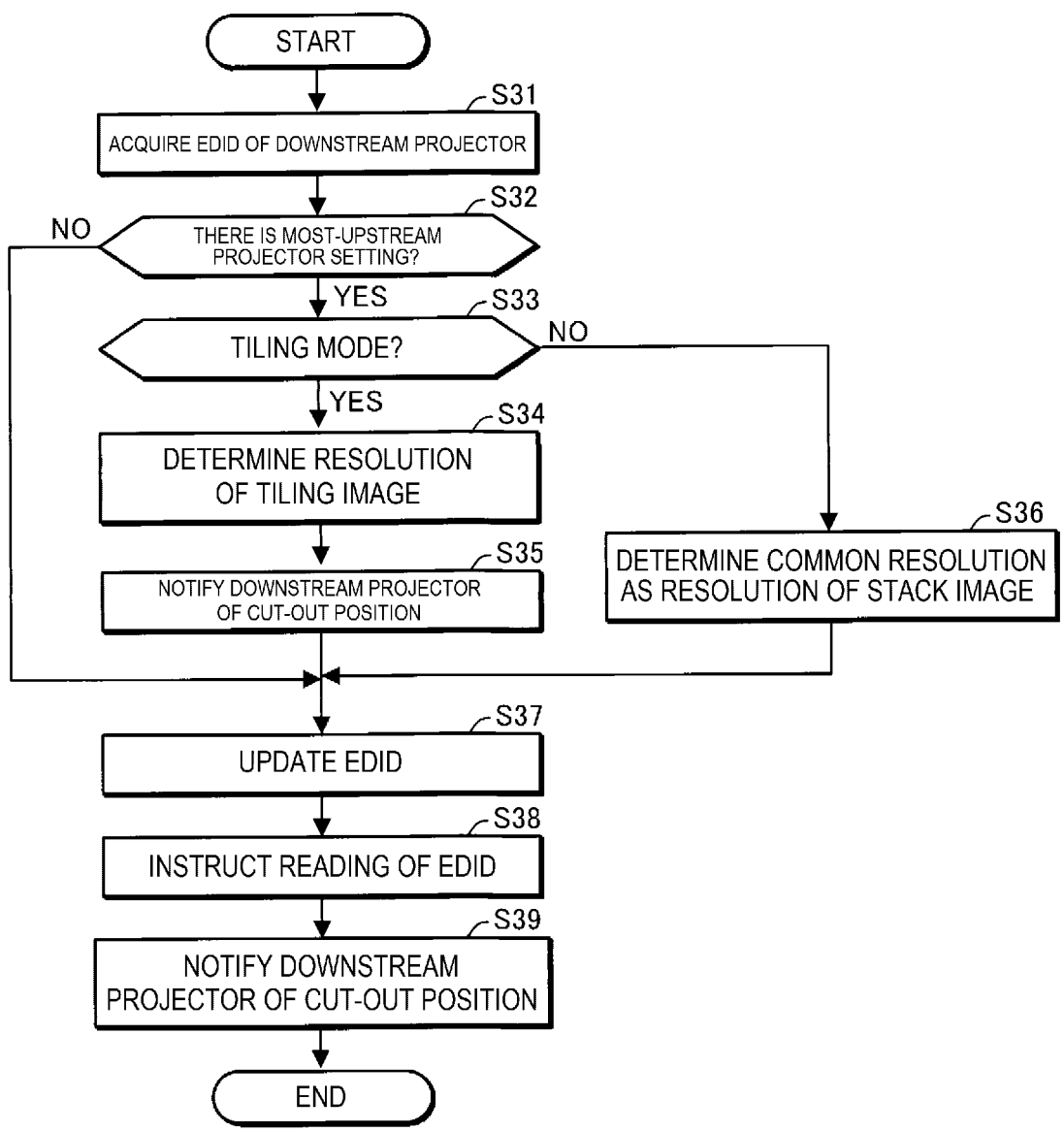
FIG. 10 is a flowchart for explaining an operation relating to acquisition of EDID in the projector.

FIG. 10 is a flowchart for explaining an operation relating to EDID in the projector 200.

For example, when the projector 200 is connected with the downstream device, the downstream communication section 202 acquires EDID from the EDID storage section 203 of the downstream device in Step S31. When the downstream device is not present, Step S31 is omitted.

Subsequently, when the setting of the most-upstream projector is not performed in Step S32, the generating section 213 updates EDID stored in the EDID storage section 203 of this projector 200 in Step S37.

In Step S37 where the setting of the most-upstream projector is not performed, the generating section 213 updates the EDID stored in the EDID storage section 203 to a combination of the initial EDID previously stored in the information storage section 210 and the EDID of the downstream device, which is acquired in Step S31.

For example, in the second projector 200b, the EDID stored in the EDID storage section 203 is updated to a combination of initial EDID of the second projector 200b and initial EDID of the third projector 200c.

Subsequently, in Step S38, the generating section 213 transmits, using the upstream communication section 204, an EDID reading instruction to instruct reading of EDID to the upstream device. When the upstream device receives the EDID reading instruction, the upstream device executes the operation shown in FIG. 10 and acquires, in Step S31, the EDID of the projector 200 present downstream.

For example, in a situation in which the initial EDID of each of the second projector 200b and the third projector 200c is stored in the EDID storage section 203 of the second projector 200b, the first projector 200a as the upstream device acquires the initial EDID of each of the second projector 200b and the third projector 200c.

On the other hand, in a case in which the setting of the most-upstream projector is performed in Step S32, when the operating mode is the tiling mode in Step S33, the generating section 213 determines the resolution of a tiling image in Step S34.

The generating section 213 determines the resolution of the tiling image with reference to the initial EDID of each of the first projector 200a, the second projector 200b, and the third projector 200c and the tiling information stored in the information storage section 210.

In this example, the generating section 213 first specifies the maximum resolution among supportable resolutions for each initial EDID. Subsequently, the generating section 213 determines the horizontal resolution of the tiling image by adding up the horizontal resolutions of the maximum resolutions, that is, the numbers of horizontal pixels. Subsequently, the generating section 213 determines the maximum vertical resolution among the vertical resolutions of the maximum resolutions, that is, the maximum number of vertical pixels as the vertical resolution of the tiling image. Further, the generating section 213 determines the minimum vertical resolution among the vertical resolutions of the maximum resolutions, that is, the minimum number of vertical pixels as the effective vertical resolution of the tiling image. Here, in the tiling image, a portion that does not fall within the effective vertical resolution is a black region.

Subsequently, in Step S35, the generating section 213 generates, based on each initial EDID, the tiling information, and the resolution of the tiling image, cut-out portion information of each of the first projector 200a, the second projector 200b, and the third projector 200c, and notifies the second projector 200b and the third projector 200c of the cut-out portion information.

The generating section 213 determines a cut-out position in the horizontal direction based on the horizontal resolution of each of the maximum resolutions, and determines a cut-out position in the vertical direction based on the vertical resolution of each of the maximum resolutions. When the generating section 213 determines the cut-out position in the vertical direction, the generating section 213 determines the cut-out position so as to make the black region not falling within the effective vertical resolution small.

In the first projector 200a, the generating section 213 stores the cut-out portion information of the first projector 200a in the information storage section 210. In the second projector 200b, the generating section 213 stores the cut-out portion information of the second projector 200b, which is notified from the first projector 200a, in the information storage section 210. In the third projector 200c, the generating section 213 stores the cut-out portion information of the third projector 200c, which is notified from the first projector 200a, in the information storage section 210.

On the other hand, when the operating mode is the stack mode in Step S33, the generating section 213 determines, with reference to the EDID of all of the cascade-connected projectors 200, a common resolution that all of the projectors 200 can support, as the resolution of a stack image in Step S36.

For example, when the EDID of the first projector 200a indicates "1920×1080", "1280×720", and "720×480" as resolutions, the EDID of the second projector 200b indicates "1280×720" and "720×480" as resolutions, and the EDID of the third projector 200c indicates "720×480" as a resolution, the generating section 213 determines "720×480" as the common resolution.

Here, the common resolution may include a plurality of resolutions. For example, it is assumed that the EDID of the first projector 200a indicates "1920×1080", "1280×720", and "720×480" as resolutions, and the EDID of the second projector 200b indicates "1280×720" and "720×480" as resolutions. In addition, when the EDID of the third projector 200c indicates "1280×720" and "720×480" as resolutions, the generating section 213 determines "1280×720" and "720×480" as the common resolution.

When Step S35 is completed and when Step S36 is completed, Step S37 is executed.

In Step S37 executed after the completion of Step S35, the generating section 213 generates first resolution information indicating the resolution of the tiling image, and updates the EDID stored in the EDID storage section 203 to EDID including the first resolution information.

On the other hand, in Step S37 executed after the completion of Step S36, the generating section 213 generates second resolution information indicating the resolution of the stack image, that is, the common resolution, and updates the EDID stored in the EDID storage section 203 to EDID including the second resolution information.

When Step S37 is completed, Step S38 described above is executed.

A8: Operation of PC 100

Figure 11:
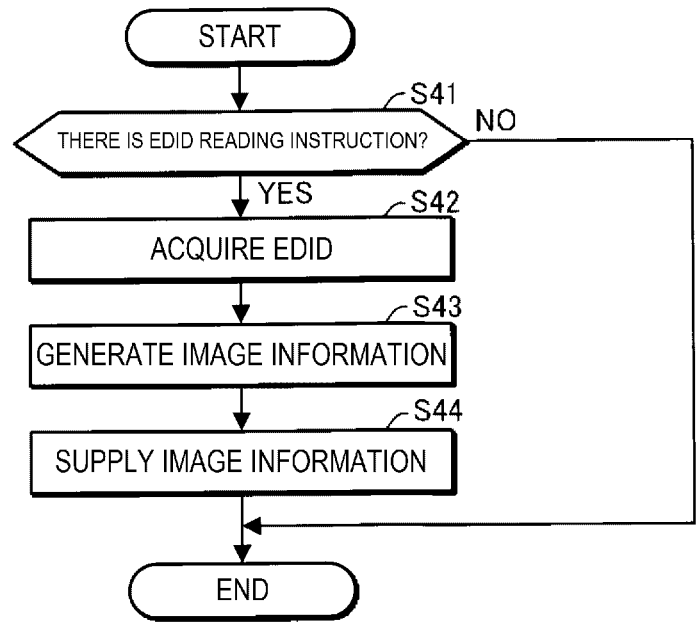
FIG. 11 is a flowchart for explaining an operation of the PC to generate and supply image information.

FIG. 11 is a flowchart for explaining an operation of the PC 100 to generate and supply image information.

When the PC-side communication section 105 of the PC 100 receives an EDID reading instruction from the first projector 200a serving as the downstream device in Step S41, the PC-side control section 104 causes the PC-side communication section 105 to acquire EDID of the first projector 200a in Step S42.

Specifically, the PC-side communication section 105 first requests the EDID from the first projector 200a. Subsequently, the upstream communication section 204 of the first projector 200a reads, in response to the request for the EDID, the EDID stored in the EDID storage section 203, and transmits the EDID to the PC 100. The PC-side communication section 105 receives the EDID from the first projector 200a.

Subsequently, in Step S43, the video controller 106 generates image information according to the EDID received by the PC-side communication section 105. Specifically, the video controller 106 generates image information having a resolution indicated by the EDID. Here, when the EDID received by the PC-side communication section 105 indicates a plurality of resolutions, the video controller 106 generates image information having the maximum resolution among the plurality of resolutions.

Subsequently, in Step S44, the PC-side image transmitting section 107 supplies the image information generated by the video controller 106 to the first projector 200a.

A9: Image Projecting Operation of Projector 200

Figure 12:
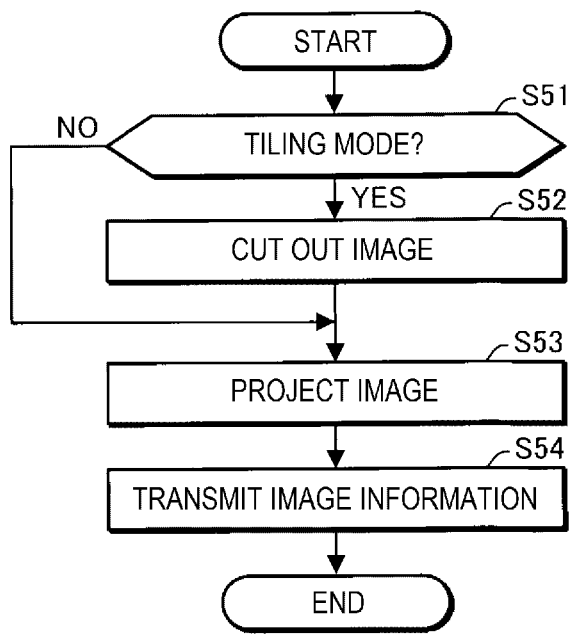
FIG. 12 is a flowchart for explaining an operation of the projector to project an image.

FIG. 12 is a flowchart for explaining an operation of the projector 200 to project an image.

When the splitter 205 receives image information from the upstream device, the splitter 205 distributes the image information to the image processing section 206 and the projection-side image transmitting section 208.

When the operating mode is the tiling mode in Step S51, the projection control section 214 causes the image processing section 206 to execute a process for cutting out, from the image information, a portion whose projection is taken charge of by the projector 200 in Step S52. The image processing section 206 executes the cut-out process using the cut-out portion information stored in the information storage section 210.

On the other hand, when the operating mode is not the tiling mode in Step S51, Step S52 is skipped.

Subsequently, in Step S53, the projecting section 207 projects an image. In the tiling mode, the image processing section 206 first performs image processing on the image information after being cut out in Step S51 and generates an image signal. In the stack mode, the image processing section 206 performs, without performing cutting out on the image information provided from the splitter 205, image processing on the image information and generates an image signal. The projecting section 207 projects an image according to the image signal generated by the image processing section 206 onto the projection surface 300.

Moreover, in Step S54, the projection-side image transmitting section 208 transmits the image information provided from the splitter 205 to the downstream device. When the downstream device is not present, Step S54 is omitted.

According to the first projector 200a and a control method of the first projector 200a according to the embodiment, the generating section 213 generates the resolution information different between the tiling mode and the stack mode. The upstream communication section 204 transmits the resolution information generated by the generating section 213 to the PC 100. For this reason, it is possible to cause the PC 100 to generate image information corresponding to a tiling image in the tiling mode and to cause the PC 100 to generate image information corresponding to a stack image in the stack mode.

The resolution information generated by the generating section 213 is included in EDID communicated between a so-called sink device and a source device. Therefore, the PC 100 can be notified of the resolution information corresponding to the tiling mode and the resolution information corresponding to the stack mode without using a new communication form for notifying the PC 100 as one example of the source device of the resolution information from the first projector 200a as one example of the sink device.

The generating section 213 generates the first resolution information indicating the resolution of a tiling image in the tiling mode, and generates the second resolution information indicating the resolution of a stack image in the stack mode. The upstream communication section 204 notifies the PC 100 of the first resolution information in the tiling mode, and notifies the PC 100 of the second resolution information in the stack mode.

For this reason, the resolution of a tiling image and the resolution of a stack image can be specified for the PC 100.

The resolution indicated by the first resolution information is greater than the resolution indicated by the second resolution information. For this reason, the resolution of a tiling image can be greater than the resolution of a stack image.

In the stack mode, the generating section 213 notifies the PC 100 of the second resolution information indicating the common resolution. For this reason, it is possible in the stack mode to cause the PC 100 to provide image information having a resolution that all of the first projector 200a, the second projector 200b, and the third projector 200c can support. Therefore, for example, even when the supportable resolution is different among the first projector 200a, the second projector 200b, and the third projector 200c, all of the first projector 200a, the second projector 200b, and the third projector 200c can project an image according to the image information from the PC 100.

B: Modified Examples

In the first embodiment, for example configurations exemplified below may be employed.

B1: Modified Example 1

In the first embodiment, the first projector 200a, the second projector 200b, and the third projector 200c may execute an edge blending process in the tiling mode. The edge blending process is a process in which in the tiling mode, a plurality of projection images are partially superimposed, and light is reduced at the superimposed portion of the projection images so that the total value of illuminance of the projection images at the superimposed portion is equal to the illuminance of a non-superimposed portion.

In this case, the horizontal resolution, that is, the number of horizontal pixels of a superimposed region is shown in the tiling information, and the generating section 213 determines, as the horizontal resolution of a tiling image, a horizontal resolution obtained by subtractingthe total value of the horizontal resolutions of the superimposed regions from the horizontal resolution of a tiling image calculated as described above.

B2: Modified Example 2

In the first embodiment and Modified Example 1, all or a portion of the functions realized by the processing section 211 by executing the program may be realized by hardware using an electronic circuit such as, for example, a field programmable gate array (FPGA) or an application specific IC (ASIC).

B3: Modified Example 3

In the first embodiment, Modified Example 1, and Modified Example 2, although the liquid crystal light valve 14 is used as one example of a light modulator, the light modulator is not limited to a liquid crystal light valve and can be appropriately changed. For example, the light modulator may have a configuration using three reflective liquid crystal panels. Moreover, the light modulator may have a configuration such as of a type using one liquid crystal panel, a type of using three digital mirror devices (DMDs), or a type of using one digital mirror device. When only one liquid crystal panel or DMD is used as the light modulator, members corresponding to the color separating optical system and the color combining optical system are not needed. Moreover, in addition to the liquid crystal panel and the DMD, a configuration in which the light emitted by the light source 13 can be modulated can be employed as the light modulator.

B4: Modified Example 4

In the first embodiment and Modified Example 1 to Modified Example 3, the most-upstream projector information, the tiling information, and the cut-out portion information may not be each exchanged between the projectors 200, but may be individually set in each of the projectors 200 by the user.

What is claimed is:

1. A projector comprising:
    a projecting section projecting a second image based on image information onto a projection surface onto which a first image is projected by another projector;
    one or more processors programmed to:
        generate resolution information indicating a resolution that is different between a first mode in which the first image and the second image are portions of an image indicated by the image information and the second image is connected with the first image and a second mode in which the first image and the second image are the image indicated by the image information and the second image is superimposed on the first image; and
    notify an image supply device supplying the image information of the resolution information;
    wherein the one or more processors are programmed to:
        generate, in the first mode, first resolution information indicating a resolution of a third image in which the first image and the second image are connected, and
        generate, in the second mode, second resolution information indicating a resolution of a fourth image in which the first image and the second image are superimposed, and
        notify, in the first mode, the image supply device of the first resolution information, and
        notify, in the second mode, the image supply device of the second resolution information.

2. The projector according to claim 1, wherein the resolution information is included in extended display identification data.

3. The projector according to claim 1, wherein the resolution indicated by the first resolution information is greater than the resolution indicated by the second resolution information.

4. The projector according to claim 1, wherein the one or more processors are programmed to:
    receive support information indicating a resolution that the another projector projecting the first image can support, and
    in the second mode, generate, as the second resolution information, information indicating a resolution that the another projector projecting the first image and the projector projecting the second image can support with reference to the support information.

5. A control method of a projector, comprising:
    projecting a second image based on image information onto a projection surface onto which a first image is projected by another projector;
    generating resolution information indicating a resolution that is different between a first mode in which the first image and the second image are portions of an image indicated by the image information and the second image is connected with the first image and a second mode in which the first image and the second image are the image indicated by the image information and the second image is superimposed on the first image; and
    notifying an image supply device supplying the image information of the resolution information;
    wherein the control method comprises:
        generating, in the first mode, first resolution information indicating a resolution of a third image in which the first image and the second image are connected, and
        generating, in the second mode, second resolution information indicating a resolution of a fourth image in which the first image and the second image are superimposed, and
        notifying, in the first mode, the image supply device of the first resolution information, and
        notifying, in the second mode, the image supply device of the second resolution information.

6. The control method according to claim 5, wherein the resolution information is included in extended display identification data.

7. The control method according to claim 5, wherein the resolution indicated by the first resolution information is greater than the resolution indicated by the second resolution information.

8. The control method according to claim 5, further comprising:
    receiving support information indicating a resolution that the another projector projecting the first image can support, and
    in the second mode, generating, as the second resolution information, information indicating a resolution that the another projector projecting the first image and the projector projecting the second image can support with reference to the support information.

* * * * *